M. CAHILL & A. F. MOREY.
SULKY-PLOW.
No. 176,595. Patented April 25, 1876.
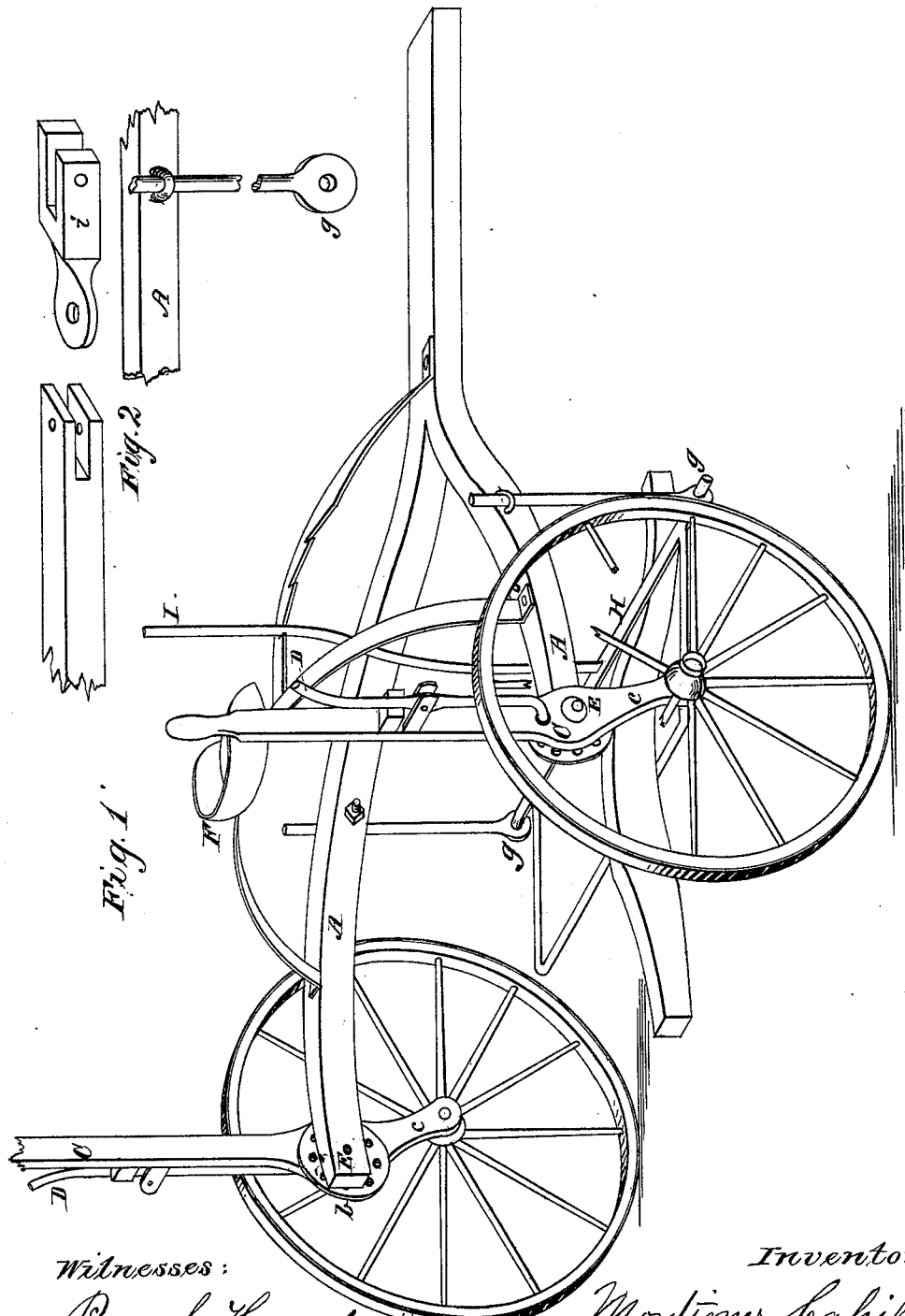
Witnesses:
Penuel Harrod
Leander H. Hewett
Inventors:
Mortimer Cahill
Amos F. Morey

UNITED STATES PATENT OFFICE.

MORTIMER CAHILL AND AMOS F. MOREY, OF AVON, ILLINOIS; SAID MOREY ASSIGNOR TO SAID CAHILL.

IMPROVEMENT IN SULKY-PLOWS.

Specification forming part of Letters Patent No. 176,595, dated April 25, 1876; application filed February 26, 1875.

*To all whom it may concern:*

Be it known that we, MORTIMER CAHILL and A. F. MOREY, both of the village of Avon, in the county of Fulton and in the State of Illinois, have invented a new and useful Improvement in Sulky Attachment for Riding-Plow and Corn-Cultivator combined; and we do declare the following to be a full, clear, and exact description of the same, reference being had to the annexed drawings, making a part of this specification.

Figure 1 is a perspective view of the sulky attachment complete, with plow-beam attached. Fig. 2 is a detached view of pins with corn-cultivator coupling or lateral and vertical joint.

The object of our invention is to obtain a simple, cheap, and efficient carriage or sulky with suitable arrangements for attaching a common plow to enable the driver to ride and govern or control the same at will, or to form a common walking corn-cultivator.

To enable others skilled in the art to make and use our invention, we proceed to the following fuller description.

Similar letters of reference refer to like parts.

A A, in Fig. 1, represent the curved side pieces or frame of the machine, connected at the front end, and open through the center or between the curved side pieces, thus obviating the necessity of cross beams or bars as used in the ordinary style of frame. *b b* represent circle-plates with holes around the outer edge, and bolted securely to the sides of frame A A. C C represent levers with spindles at the ends, or extended sufficiently to form crank-axles *c c*, for wheels, and spring-rods D D, attached at or near the center, with the lower end curved and passing through the lever, so as to catch in the holes in edge of circle-plates *b b*, when the lever is bolted against the circle-plates by means of bolts E, as shown in Fig. 1, so as to admit of the lever being turned around on the circle-plate and stopped, or held by means of spring-rod D at any desired point, thus enabling the operator to gage the plow to any desired depth, or to raise the same for transportation. F is is the seat in combination with the frame, as shown in Fig 1. *g g* are iron rods or hangers with holes at the lower end, and coupled or clamped to the frame by means of eyebolts. H is a rectangular frame constructed of iron or any suitable material, the outer ends of the front side of which pass through the holes in hangers or rods *g g*. To this frame is attached a lever, I, by which the frame can be raised or lowered at pleasure, and to which the plow-beam is attached by means of a clevis. Said frame can be detached from bolts, and a corn-cultivator coupling or the lateral and vertical joint *i* attached, as shown in the detached view in Fig. 2.

Having thus described our invention, what we claim as new, and desire to secure by Letters Patent, is—

1. The skeleton frame A A, composed of a tongue with arms branching to the rear, having the hangers *g g* and circle-plates *b b*, in combination with the levers C C, extended to form crank-axles *c c* and spring-catches D D, substantially as shown and described.

2. The combination of frame A A, hangers *g g*, levers C C, and circle-plates *b b* adapted to carry the rectangular frame H, supporting a plow-beam, or the double-jointed couplings *i* attached to cultivator-beams, constructed and arranged to operate substantially as and for the purpose set forth.

MORTIMER CAHILL.
            AMOS F. MOREY.

Witnesses:
  HARRY BABBITT,
  LEANDER H. HEWETT.